Patented June 24, 1952

2,601,352

UNITED STATES PATENT OFFICE 2,601,352

SILICA SOLS AND METHOD OF MAKING SAME

Frederick J. Wolter, Cleveland, Ohio, assignor to E. I. du Pont de Nemours & Company, Wilmington, Del., a corporation of Delaware No Drawing. Application January 16, 1950, Serial No. 138,933

15 Claims. (Cl. 252—313)

This invention relates to silica-organic nitrogen base compositions and processes for producing them, and is more particularly directed to stable sols and water-dispersible solid products, in both of which silica made up of dense, ultimate particles 15 to 130 millimicrons in diameter is intimately mixed with an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the sols additionally containing water, and is further directed to processes in which intimate admixture of a silica and a base of the above-described types is effected in water to make the sols, and a sufficient portion of the water is then removed to make the solid products.

Silica in the form of submicroscopic particles has many important uses. In the treatment of textile fibers to impart slip resistance, as a filler in rubber, as an adjuvant to floor waxes for improving slip resistance, and as a pigment in paints for special uses, for instance, silica in such submicroscopic form has advantageously been used. Customarily the silica has been added in the form of an aqueous sol, because in the state of subdivision desired a dry silica product would be difficult to handle in large quantities due to dusting. Furthermore, for the above-mentioned uses and others, silica in such forms as glass, quartz, or sand cannot be disintegrated to the desired fine particle size by mechanical grinding except at prohibitive cost; hence chemical means have been employed, and one of the most practicable forms of product to obtain by chemical means is the aqueous sol.

The aqueous silica sols hitherto known have been expensive to ship, handle, and store because of their large water content. Concentrations of $SiO_2$ much in excess of 20% by weight have been unstable against gelling; hence it has been necessary to handle about four parts of water for each part of silica. Recently, stable sols have been prepared containing 30% or more of silica, by processes comprising adding increments of alkali-stabilized silica sol to a heel of sol while evaporating water at elevated temperature until 5 parts by weight of silica as increment have been added per part of silica originally present as heel, as described in Bechtold and Snyder application Ser. No. 65,536, filed December 15, 1948, now Patent No. 2,574,902. When such alkali-stabilized sols are concentrated much beyond about 40% $SiO_2$, however, they set irreversibly to gels. Also, the sols are detrimentally affected by freezing, so that heated storage and shipping facilities are required during winter weather.

Even a small amount of alkali interferes with some uses for silica sols, and this disadvantage cannot be corrected merely by neutralizing the alkali with an acid because salts which act as electrolytes are thus formed and electrolytes decrease the stability of the sols. In my copending application, Ser. No. 97,090 filed June 3, 1949, now abandoned, of which the present application is a continuation-in-part, I have described processes for removing electrolytes from sols containing silica particles having an average diameter above 10 millimicrons, the processes comprising treating the sol, first with a cation-exchanger and then with an anion-exchanger. The cation-exchanger may be in combination with an organic nitrogen base such as a quaternary ammonium base or an organic amine base, and may thus replace the sodium of a sodium-stabilized sol by ion-exchange reaction. The organic nitrogen base may, alternatively, be added to the deionized sol. The present application is directed to this aspect of my above-identified prior application.

It is therefore an object of the present invention to provide processes for producing novel aqueous silica sols. Another object is to provide such sols, in which the silica is present in the form of dense ultimate particles from 15 to 130 millimicrons in diameter and there is no substantial amount of alkali metal base or electrolyte present. Another object is to provide such sols which are not detrimentally affected by exposure to temperatures below the normal freezing point of water. Another object is to provide sols which are stabilized by the presence therein of an organic nitrogen base. Another object is to provide novel solid products which are readily redispersible in water and which contain upwards of 50% by weight of silica in particulate form, intimately mixed with an organic nitrogen base, and to provide processes for making such products. Further objects will appear hereinafter.

The foregoing and other objects are accomplished according to this invention by making an aqueous dispersion of silica in the form of dense, ultimate particles 15 to 130 millimicrons in diameter, and intimately mixing with this dispersion an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, whereby silica sols which are stable at high concentrations and over wide ranges of temperature are obtained, and are further accomplished by removing a sufficient portion of the water from the sols to make solid products, the products being readily redispersible in water to form stable sols.

The products of this invention may contain an unusually high concentration of silica. The sols may have a silica content in excess of 50% by weight, and the solid products may contain as high as 70% $SiO_2$ or even more. The savings in shipping and handling charges on such concentrated products, in contrast to, say, 20% $SiO_2$ sols, will be readily apparent. The solid products are, from the practical viewpoint, "soluble" in water—that is, when they are added to water the silica is redispersed to form a stable sol with no more difficulty than is encountered in dissolving a truly soluble material in water.

The products of the invention enjoy the further advantage that they are free of alkali metal ions. If desired, the nitrogen base used in the products may be volatile, as is the case with methyl amine, and this may be boiled off at the point of use of the silica products, whereby a sol or solid silica product substantially free of electrolytes is the ultimate form of the silica. This freedom from alkali metal ions and ability to be free of electrolytes is highly advantageous in certain uses such as in the manufacture of phosphors for fluorescent lighting tubes and in catalyst manufacture.

The products of the invention have the further advantage that they are not detrimentally affected by wide changes of temperature. At low temperatures—below the normal freezing point of water, they either do not freeze, or if they do freeze, they redisperse to form stable sols upon thawing. On the other hand, they may be heated to 95° C. indefinitely without precipitation or gelling.

THE SILICA DISPERSION TREATED

An aqueous silica dispersion for treatment with an organic nitrogen base according to the present invention may be prepared in any manner capable of giving the desired degree of subdivision of the silica in the form of dense, ultimate particles. It will be understood that the ultimate particles of silica need not necessarily be associated into chains or loose, open networks, but whether discrete or associated, the individual particles will be dense and will have an average diameter in the range from 15 to 130 millimicrons.

The silica dispersion used as the starting material in a process of this invention need not be a stable sol, since the treatment with organic nitrogen base will impart stability. It is sufficient if the dispersion is a suspension of particles of a character such that intimate mixing with the organic nitrogen base can be effected.

The ultimate particles of silica in silica dispersions to be treated must not be too small, and must be dense. The common silica sols made by neutralizing sodium silicate with an acid contain particles which are too small or not sufficiently dense to use without further treatment. Similarly, a silica sol prepared by ion-exchange, as in the Bird Patent 2,244,325, is composed of silica particles well below ten millimicrons in diameter. This sol and other similar sols prepared by prior art methods and which have small diameter particles are quickly precipitated by a change in pH to form a gel. They are accordingly unsuitable for use according to the present invention until further treated.

Now the silica sols of dense particles which it is preferred to use according to the present invention may be made by heating a silica sol, prepared by ion-exchange in the manner described in Bird 2,244,325 and stabilized with a small amount of alkali, to a temperature above 60° C. and adding further quantities of the same type of sol until at least five times as much silica has been added to the original quantity as was at first present. The product thus produced is stable against gelation at the pH of the present processes and it contains discrete silica particles having a molecular weight, as determined by light-scattering, of more than one-half million. The particle sizes can be made in excess of about fifteen millimicrons and may range upwardly to, say, about one hundred and thirty millimicrons. The particles in a particular sol are surprisingly uniform in size, but the size can be varied depending upon the process conditions under which they were formed. The process as above outlined is fully set out in the application of Max F. Bechtold and Omar E. Snyder, in application Serial No. 65,536, filed December 15, 1948.

The particles of sol are quite dense and this may be shown by drying the particles and then determining the amount of nitrogen adsorption. From the nitrogen adsorption it may be determined that the particles have a surface area not greatly in excess of that computed for the particle size as determined by electron micrograph. It will be evident that if the particles are not dense but rather are porous then the apparent surface as determined by nitrogen adsorption will be much higher than that expected from the particle diameters. Nitrogen adsorption, accordingly, affords an easy measure of the density of the particles. Summarizing then, the preferred sols for use as starting materials according to the present invention have particles of such density that the surface area as determined by nitrogen adsorption is not greatly in excess of that computed for the particle size as determined by examination of an electron micrograph and the adsorption should not be more than about 30% greater than that computed from the apparent particle sizes.

The method of determining the surface area by nitrogen adsorption is described in "A New Method for Measuring the Surface Areas of Finely Divided Materials and for Determining the Size of Particles" by P. H. Emmett in "Symposium on New Methods for Particle Size Determination in the Subsieve Range" in the Washington Spring Meeting of A. S. T. M., March 4, 1941.

According to the processes of Bechtold and Snyder it is preferred to produce sols which have a silica:alkali ratio of from 60:1 to 130:1. This refers to the weight ratio of total silica expressed as $SiO_2$ to total alkali expressed as $Na_2O$. The ratio may be even smaller and may go down to, say, 20:1 when the sols used are of moderately low concentration, say, below about 15% $SiO_2$. It will be understood that if potassium is used as an equivalent of sodium it should be used at the same molar ratios. Such sols are then deionized by ion-exchange according to the processes of my prior application Ser. No. 97,090, now abandoned, to give the preferred silica dispersions for treatment with an organic nitrogen base according to the present invention.

Instead of using a process of the Bird Patent for preparing silica particles to be densified by the processes of Bechtold and Snyder, the process of the Voorhees patent 2,457,971 can be used instead. Similarly any other method of preparing a silica sol of low molecular weight can be used to prepare a sol which will then be used for the preparation of a sol containing dense particles.

Instead of the sols as above described, which have extremely dense particles and very uniform particle size, one may use instead the somewhat less dense and non-uniform type of product which can be made by precipitation of a silica gel and redispersion with alkali. Such a process is described, for instance, in the White Patent 2,375,738. The products produced by such processes contain considerable amounts of impurities. The deionizing processes of my above-mentioned prior application can accordingly be used to advantage in removing these impurities. The preferred processes of the invention and the preferred products of the invention, however, employ starting sols as previously described which are prepared by ion-exchange because the rather great amount of impurities and the lack of uniformity of the products just described leads to slightly less perfect results than can be obtained under the best conditions.

The products prepared by redispersion of silica gel ordinarily have a good deal higher nitrogen adsorption than would be indicated by apparent diameter. This shows considerable porosity. The nitrogen adsorption is about 50% greater than that computed.

Still other silica sols may be used and it will be seen that it is important only that they have a particle size from about 15 to 130 millimicrons and they should be reasonably dense. It is this latter property which sharply distinguishes them from silica gels. Generally, it may be stated that for use in processes of the invention it is preferred to use sols, the particles of which are uniform in diameter and have a diameter between fifteen millimicrons and one hundred and thirty millimicrons, the particles being further characterized by having a density such that the size as indicated by nitrogen adsorption is not more than about 30% greater than that computed from the apparent particle size as determined by the electron micrograph. More broadly, products may be used in which the nitrogen adsorption indicates a size as much as, say, 100% greater than the size as determined by examination of an electron micrograph.

The silica dispersion to be treated with an organic nitrogen base according to the present invention may also be prepared by building up dense silica particles by processes described in Iler application Ser. No. 99,349, filed June 15, 1949, and then redispersing the precipitated products, or carrying the processes only to the points of precipitation. According to this method, an acid such as sulfuric is added to a hot (above 60° C.) solution of sodium silicate over a period of time. The sodium ion concentration in the solution must not exceed one normal.

An alternative method of effecting such build-up of dense particles is described in application Ser. No. 99,350, filed June 15, 1949, by G. B. Alexander, R. K. Iler, and myself. According to this method dense silica particles are made by heating a silica sol to a temperature above 60° C. and adding thereto a silicate solution and enough of an acid to maintain a pH from eight to eleven, the heating to above 60° C. and the addition of silicate and acid being continued at least until the silica particles in the sol have reached an average particle size greater than 15 millimicrons.

The proportion of silica in the aqueous dispersion to be treated with an organic nitrogen base according to this invention may be varied considerably. It is preferred to employ as high a concentration as feasible, and, as above indicated, difficulties due to precipitation are encountered when the concentration greatly exceeds 30% $SiO_2$ by weight, although after adding the organic nitrogen base the stability greatly improves, so that a repeptization even of precipitated silica particles is possible, provided the particles have not strongly agglomerated after precipitation.

THE ORGANIC NITROGEN BASE

The organic nitrogen base employed in this invention may be of the amine type or the quaternary ammonium type. In either case it will contain organic groups attached to the nitrogen atom. These organic groups may contain one or more carbon atoms, and they may be aliphatic, aromatic, or heterocyclic. A single organic group may have more than one point of attachment to the nitrogen atom, and there may be one, two, or three organic groups on the nitrogen in the case of amines; quaternary ammonium bases will, of course, have four.

The structure of the organic nitrogen base must be such that each organic substituent on the nitrogen atom contains no carbon atom farther removed from the nitrogen than 5 consecutive carbon atoms. If the organic group is the normal amyl group, for example, the terminal carbon atom is 5 consecutive carbon atoms removed from the point of attachment. In the case of a phenyl group, the carbon of the benzene ring in the para position is only 4 carbon atoms removed from the point of attachment, because carbons may be counted in either direction around the ring. Similarly, a benzyl group, containing a methyl substituent on the benzene ring, comes within the definition.

The total number of carbon atoms attached to the nitrogen atom of the base exclusively through carbon must not be more than 4 times the number of substituents. Thus, since quaternary bases contain 4 substituent carbon groups, the total number of carbons attached to the nitrogen exclusively through carbon is 16. Similarly, the largest number of carbon atoms attached through carbon to the nitrogen of an amine will be 3 times 4, or 12, and it can be as large as this only in the case of tertiary amines. In the case of a primary amine, with only one substituent organic group, the total number of carbon atoms possible is 4. It will be understood that there may be more carbon atoms than 4 times the number of substituent groups if the carbons are not consecutive but are joined through other atoms such as oxygen. Thus, amines or quaternary ammonium bases substituted with polyethylene oxide groups, in which the carbon groups are separated by oxygen atoms according to the arrangement $N-(C-C-O)_x$ are operable even when the total number of carbons is above the limit set for directly-connected carbons.

Among the quaternary ammonium bases which may be used are those in which the substituents on the nitrogen are aliphatic, alicyclic, aromatic or heterocyclic groups. The groups may all be the same, or may be different. Specific quaternary ammonium hydroxides which may be used are those in which the substituents are: Tetramethyl, tetraethyl, tetraisopropyl, tetra-n-propyl, tetraisobutyl, tetra-n-butyl, tetra-sec.-butyl, tetra-tert.-butyl, or combinations of the foregoing, methyl-triamyl, dimethyldiamyl, dimethyldiallyl, benzyltrimethyl, tetraethanol, trimethylethanol, phenyltrimethyl, trimethylcyclohexyl, n-methylpyridinium, n,n,-dimethyl piperidinium, n,n-dimethylmorpholinium.

Among the amine bases which may be used are those in which the substituents on the nitrogen are aliphatic, aromatic, alicyclic, and heterocyclic groups. They may be primary, secondary, or tertiary. The groups may all be the same or may be different. Specific amines which may be used are those in which the substituents are: Mono-di, or tri-methyl; mono-, di-, or tri-ethyl; mono-, di-, or tri-isopropyl; mono-, di-, or tri-n-propyl; mono-, di-, or tri-isobutyl; or combinations of the foregoing substituents; diethanolphenyl; mono-cyclopropyl; morpholine; mono-, di-, or tri-ethanolamine; pyrazine. Also useful are pyridine, piperidine, and similar cyclic compounds in which the nitrogen is in the ring. The aromatic amines are not preferred because of limited solubility.

THE PREPARATION OF THE SILICA-N BASE PRODUCTS

To form a stabilized sol of the present invention, a suitable aqueous silica dispersion and a suitable organic nitrogen base, as above defined, are intimately mixed. The base is preferably water-soluble, and hence intimate mixture is obtained as it goes into solution. Compatibility of the more highly substituted amines with water is improved by the addition of a water-soluble organic solvent such as ethyl alcohol, acetone, or other water-soluble alcohols or ketones. Agitation is, of course, a preferred way to effect mixing.

The proportion of organic nitrogen base to silica may be considerably varied. Substantial effects on stability and similar properties of the silica are noticed when the nitrogen base is present in the amount of about 6% of the weight of silica. Larger amounts may advantageously be used, but it is preferred to limit the amount of nitrogen base to 50% of the weight of silica, since above this amount, depolymerization of the silica starts to occur to an undesirable extent.

To make the solid products from the sols, water is removed by any suitable method. Evaporation at reduced pressure, or elevated temperature, or both, may be used. Other methods, such as solvent extraction, may be employed in particular instances.

THE PRODUCTS

The products of this invention, whether in sol or solid form, are characterized by containing silica in the form of dense, ultimate particles 15 to 130 millimicrons in diameter and by containing, in intimate association with the silica, an organic nitrogen base as above described. The size of the silica ultimate particles may be determined from electron micrographs and their density by comparing specific surface area measurements calculated from electron micrographs with specific surface areas calculated from nitrogen adsorption; preferably the latter should not exceed the former by more than 30%, or more broadly, by more than 100%.

The products of this invention are useful for a wide variety of purposes. As compared with similar silica products containing no organic nitrogen base they have improved stability against gelling and deterioration, particularly over a wide temperature range. They have improved compatibility with organic solvents and compounds, such as alcohols, acetone, and ketones generally, and like materials. They have substantially improved film-forming properties.

Specific uses for which the products are particularly well adapted include treating textiles and textile fibers to improve slip-resistance and snag-resistance; as adjuvants to floor waxes for improving slip-resistance; as an ingredient of paints and coating compositions; as fillers in plastics and elastomers, as bodying-agents in greases; in adhesives; as carriers for insecticides and fungicide; as an intermediate in the preparation of phosphors for electrical purposes; in the preparation of catalysts; and in preparations generally where an easily-removable stabilizer is required.

Examples

The invention will be more readily understood from the following illustrative examples.

Example 1

Tetramethyl ammonium hydroxide (10 parts) was added to 350 parts of a colloidal silica sol which had been prepared by a build-up process and possessed the following properties:

| | |
|---|---|
| $SiO_2$ _____percent__ | 28.2 |
| Na _____do____ | 0.02 |
| $SO_4$ _____do____ | 0.002 |
| pH _____do____ | 3.49 |
| Molecular weight_____millions__ | 16.2 |
| Viscosity (25° C.) _____centistokes___ | 4.55 |
| Density _____g/ml.__ | 1.19 |
| $D_n$ _____millimicrons__ | 16.0 |
| $D_s$ _____do____ | 19.0 |
| $S_c$ _____sq. meters/gram__ | 143 |
| $S_N$ _____do____ | 181 |
| $D_s/D_M$ _____ | 1.19 |
| $S_c/S_N$ _____ | 0.79 | where:

Molecular weight=value determined by light scattering measurements.

$D_n$=Average particle diameter based on number and diameter of particles measured on an electron-micrograph of the sol.

$D_S$=Average particle diameter based upon uniform spheres having the same average surface as the range of particles measured on electron micrograph.

$S_N$=Specific surface area as determined by nitrogen adsorption.

$S_c$=Specific surface area as calculated from $D_s$, the "surface area average diameter." The value $S_c$ is calculated from the formula $$S_c = \frac{3000}{D_s}$$

$D_s/D_n$=A measure of the distribution of particle size.

$S_c/S_N$=A measure of the porosity of the ultimate particles.

The stabilized sol resisted successive freezings at 12° C. and showed no indication of gelation upon three months storage at 95° C. The sol was also concentrated until the $SiO_2$ content had reached 50 per cent and the resulting sol was stable toward freezing and storage. Upon further concentration, the sol deposited a clear, tough film which cracked upon extensive drying. The dried product, however, "dissolved" readily in water to yield a clear stable silica sol.

Silica sols stabilized with this quaternary ammonium hydroxide were compatible with both acetone and alcohol and could be incorporated into sols of certain organic materials such as gelatin and polyvinyl alcohol.

*Example 2*

Morpholine (10 parts) was added to the silica sol (350 parts) previously described in Example 1 to yield a sol which was stable toward freezing at 12° C. and showed no indication of gelation upon storage at 95° C. This sol also possessed excellent compatibility with water-miscible organic compounds.

*Example 3*

Another example of this invention would be to add ethanolamine (10 parts) to a sol (400 parts) containing dense silica particles which had been prepared by a buildup process. A sol characterized by the following properties could be used:

| | | |
|---|---|---|
| $SiO_2$ | per cent | 30 |
| Na | do | 0.02 |
| $SO_4$ | do | 0.002 |
| Molecular weight | millions | 54.2 |
| Density | degree Bé | 24.9 |
| pH | | 3.5 |
| $D_n$ | millimicrons | 28.4 |
| $D_s$ | do | 31.8 |
| $S_n$ | sq. meters/gram | 97 |
| $S_c$ | do | 97 |
| $D_s/D_n$ | | 1.12 |
| $S_c/S_N$ | | 1.00 |

The symbols are defined in Example 1.

The properties of this sol would be comparable to those of the sols described in Examples 1 and 2.

I claim:

1. A solid, water-dispersible composition comprising silica made up of dense, ultimate particles 15 to 130 millimicrons in diameter intimately mixed with an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups.

2. A sol comprising an aqueous dispersion of silica made up of dense, ultimate particles 15 to 130 millimicrons in diameter intimately mixed with an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the sol being substantially free of ions other than those of the organic nitrogen base.

3. A solid, water-dispersible composition comprising silica made up of dense, ultimate particles 15 to 130 millimicrons in diameter intimately mixed with an organic nitrogen base, selected from the group consisting of organic amines and quaternary ammonium hydroxides, in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups.

4. A sol comprising an aqueous dispersion of silica made up of dense, ultimate particles 15 to 130 millimicrons in diameter intimately mixed with an organic nitrogen base, selected from the group consisting of organic amines and quaternary ammonium hydroxides, in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the sol being substantially free of ions other than those of the organic nitrogen base.

5. A solid, water-dispersible composition comprising silica made up of dense, ultimate particles 15 to 130 millimicrons in diameter intimately mixed with an organic nitrogen base, selected from the group consisting of organic amines and quaternary ammonium hydroxides, in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the proportion of nitrogen base being from 6 to 50% of the weight of the silica.

6. A sol comprising an aqueous dispersion of silica made up of dense, ultimate particles 15 to 130 millimicrons in diameter intimately mixed with an organic nitrogen base, selected from the group consisting of organic amines and quaternary ammonium hydroxides, in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the proportion of nitrogen base being from 6 to 50% of the weight of the silica, and the sol being substantially free of ions other than those of the organic nitrogen base.

7. In a process for making silica sols the steps comprising making an aqueous dispersion of silica in the form of dense, ultimate particles 15 to 130 millimicrons in diameter and intimately mixing with this dispersion an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups.

8. In a process for making silica sols the steps comprising making an aqueous dispersion of silica in the form of dense, ultimate particles 15 to 130 millimicrons in diameter and intimately mixing with this dispersion an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the proportion of nitrogen base being from 6 to 50% of the weight of the silica, and the sol being substantially free of ions other than those of the organic nitrogen base.

9. In a process for making solid, water-dispersible compositions the steps comprising making an aqueous dispersion of silica in the form of dense, ultimate particles 15 to 130 millimicrons in diameter and intimately mixing with this dispersion an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, and removing water from the mixture until it solidifies.

10. In a process for making solid, water-dispersible compositions the steps comprising making an aqueous dispersion of silica in the form of dense, ultimate particles 15 to 130 millimicrons in diameter and intimately mixing with this dispersion an organic nitrogen base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups, the proportion of nitrogen base being from 6 to 50% of the weight of the silica, and removing water from the mixture until it solidifies.

11. A sol comprising an aqueous dispersion of silica made up of dense, ultimate particles 15 to 130 millimicrons in diameter intimately mixed with an organic quaternary ammonium base in which each organic substituent on the nitrogen atom contains no carbon atom farther removed from the nitrogen than 5 consecutive carbon atoms and the total number of carbon atoms attached to the nitrogen exclusively through carbon is not more than 4 times the number of substituent groups.

12. A sol comprising an aqueous dispersion of silica made up of dense, ultimate particles 15 to 130 millimicrons in diameter intimately mixed with tetramethyl ammonium hydroxide, the sol being substantially free of ions other than those of the tetramethyl ammonium hydroxide.

13. A sol comprising an aqueous dispersion of silica made up of dense, ultimate particles 15 to 130 millimicrons in diameter intimately mixed with ethylamine, the sol being substantially free of ions other than those of the ethylamine.

14. A sol comprising an aqueous dispersion of silica made up of dense, ultimate particles 15 to 130 millimicrons in diameter intimately mixed with triethanolamine, the sol being substantially free of ions other than those of the triethanolamine.

15. A sol comprising an aqueous dispersion of silica made up of dense, ultimate particles 15 to 130 millimicrons in diameter intimately mixed with morpholine, the sol being substantially free of ions other than those of the morpholine.

FREDERICK J. WOLTER.

REFERENCES CITED

The following references are of record in the file of this patent:

UNITED STATES PATENTS

| Number | Name | Date |
|---|---|---|
| 2,450,394 | Brown et al. | Sept. 28, 1948 |
| 2,506,316 | Pierce | May 2, 1950 |